(12) United States Patent
Breidenthal

(10) Patent No.: US 11,866,158 B2
(45) Date of Patent: Jan. 9, 2024

(54) ANTI-FLIP DEFLECTOR STRUT FOR AMPHIBIOUS AIRCRAFT

(71) Applicant: Robert Edward Breidenthal, Seattle, WA (US)

(72) Inventor: Robert Edward Breidenthal, Seattle, WA (US)

( * ) Notice: Subject to any disclaimer, the term of this patent is extended or adjusted under 35 U.S.C. 154(b) by 146 days.

(21) Appl. No.: 17/467,242

(22) Filed: Sep. 5, 2021

(65) Prior Publication Data

US 2022/0073194 A1    Mar. 10, 2022

Related U.S. Application Data

(63) Continuation of application No. 63/075,259, filed on Sep. 7, 2020.

(51) Int. Cl.
*B64C 25/66* (2006.01)
*B64C 35/00* (2006.01)

(52) U.S. Cl.
CPC ............ *B64C 25/66* (2013.01); *B64C 35/001* (2013.01); *B64C 35/008* (2013.01)

(58) Field of Classification Search
CPC .............................. B64C 35/001; B64C 25/66
See application file for complete search history.

(56) References Cited

U.S. PATENT DOCUMENTS

2018/0050791 A1*   2/2018   Robinson .............. B64C 35/008

* cited by examiner

*Primary Examiner* — Brady W Frazier
*Assistant Examiner* — Shanna Danielle Glover

(57) ABSTRACT

Disclosed are various embodiments for reducing or eliminating the nose-down pitching moment during water landings of amphibious aircraft when the landing gear is in the down position. Shielding struts forward of the wheels generate hydrodynamic lift and reduce hydrodynamic drag in order to alter the pitching moment about the aircraft center of mass.

14 Claims, 5 Drawing Sheets

ANTI-FLIP DEFLECTOR STRUT FOR AMPHIBIOUS AIRCRAFT

TECHNICAL FIELD

The present invention relates to the improved safety of amphibious aircraft during water landings when the landing gear is inadvertently deployed in the down position.

BACKGROUND ART

If a pilot of an amphibious aircraft mistakenly deploys the landing gear wheels down in a water landing due to distraction or other reason, the aircraft typically flips over. Sometimes the occupants are trapped within the aircraft and drown. Automatic alarms to alert the pilot to reconfigure the wheels have failed to prevent these tragedies. After accidents, some pilots have complained that they could hardly concentrate because of a loud alarm going off. About one person a year dies this way. Even if the occupants all survive, the aircraft is damaged, and it may pollute the waterway.

Training has not worked to prevent these accidents in the past. Until human nature changes, it seems probable that pilots will continue to make mistakes in the future. The purpose of the present invention is to provide as close to a foolproof design as possible to prevent these needless deaths.

When a conventional amphibious aircraft with pontoon floats approaches the water surface with the wheels mistakenly deployed in the down position, the wheels first pierce the surface. Surprisingly, the drag from a surface-piercing strut is proportional to the square of the width of the strut, according to Hoerner (1965), rather than proportional to the frontal area of the bluff body. This result is because the drag is associated with splashing at the free surface. For small depths much less than about the width of the strut, the drag is independent of the depth of the surface-piercing strut. As the depth increases, eventually the drag will depend on the depth as well as the width of the strut.

A related reference on spray drag is Chapman (1971). The wake or lee of surface piercing struts at large Froude number is typically ventilated by air (Kiceniuk 1954). At sufficiently high speed, there can even be cavitation, where the static pressure falls to the vapor pressure of water at that temperature and the water boils. For non-steady flow, such as a sudden encounter with the surface, for example due to waves or rapid descent, virtual mass effects become important (von Karman 1929).

At landing speeds, the large drag force component from the surface-piercing wheels acts well below the aircraft's center of mass, or "center of gravity" (CG). The result is a large nose-down pitching moment about the center of mass. The aircraft typically flips over in a violent somersault or half somersault. After a severe deceleration, occupants may then find themselves inverted and trapped in a flooding cabin, assuming that they are still conscious.

Figure 1:
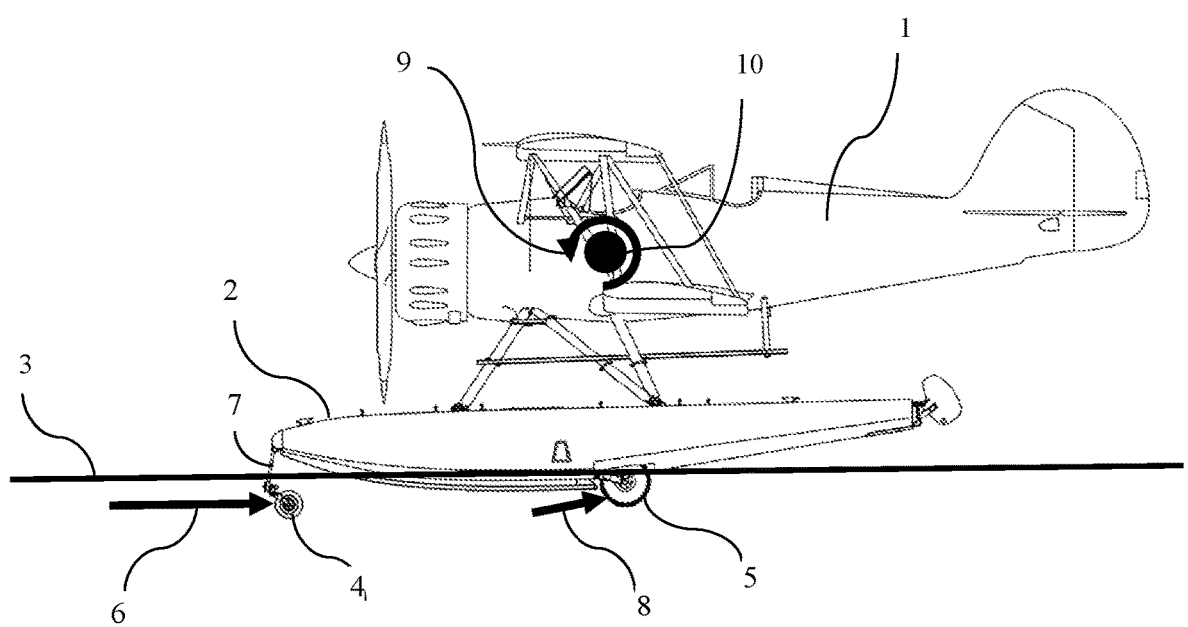
Figure 2:
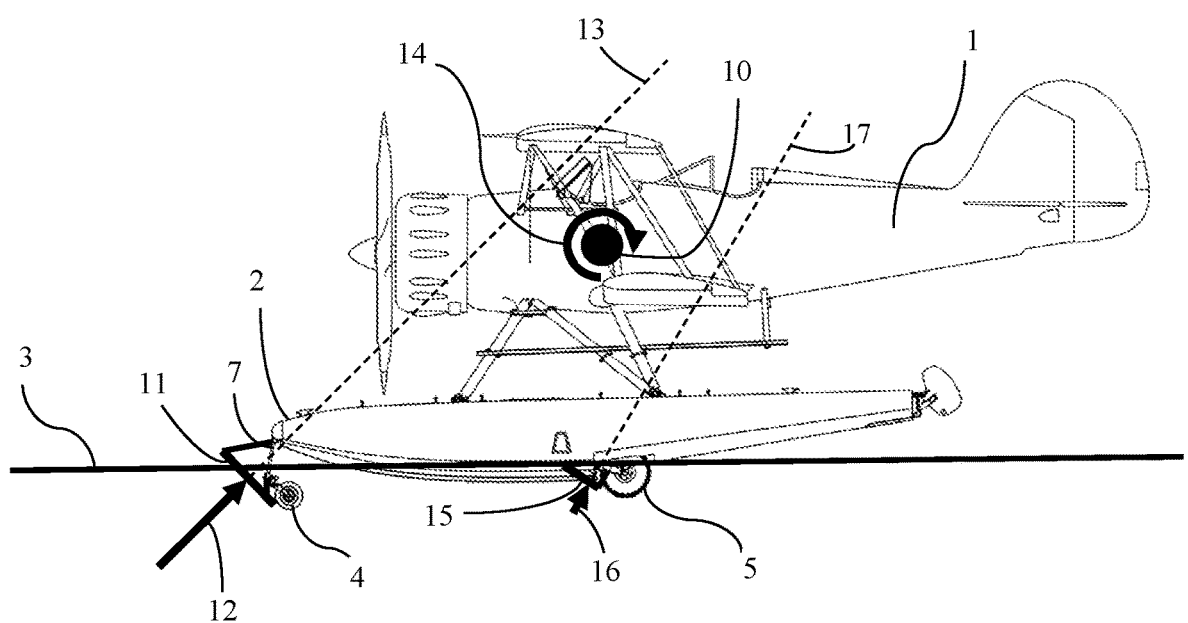
Figure 3:
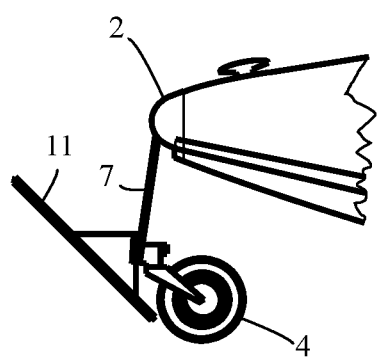
Figure 4:
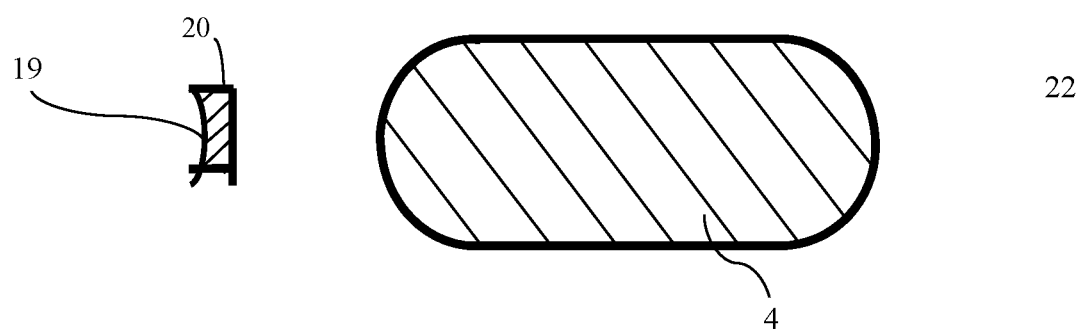
Figure 5:
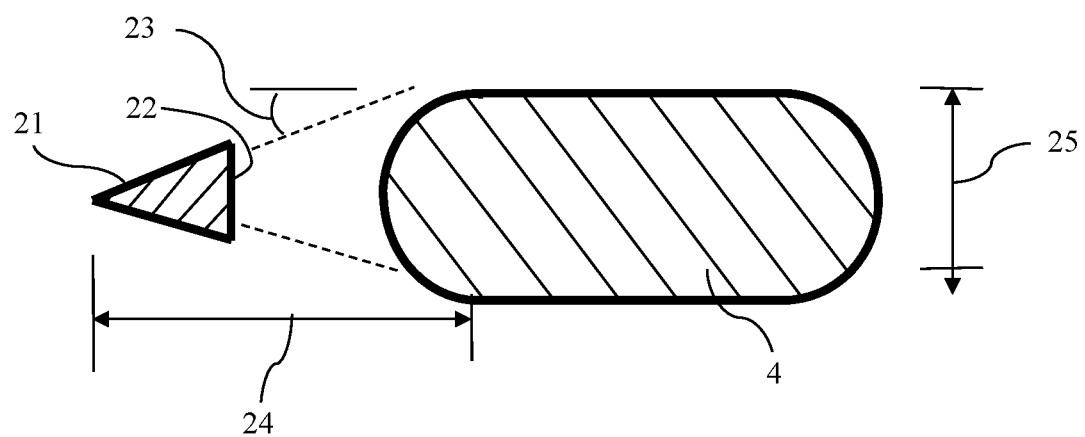

A nose-wheel support structure for a conventional amphibious nose gear is illustrated in FIG. 1. A large, flat-plate spring is oriented at a negative angle of attack. When it pierces the water surface at landing speed, a significant negative lift force component as well as a large drag force component are generated, both of which contribute to a large nose-down pitching moment about the center of mass of the aircraft. The force vector from these two components is pointed down and aft, essentially orthogonal to the plate, with a large moment arm about the center of mass.

INVENTION

The remedy is simple. Reduce or completely eliminate the nose-down pitching moment from the landing gear piercing the water surface.

While it is not feasible to eliminate the large drag force component of the surface-piercing wheels moving at landing speed, it is feasible to reduce their drag component while simultaneously generating a sufficiently large lift force component from the nose gear that rotates the resultant force vector up, so that it points closer toward the aircraft's center of mass. If that total force vector happens to point exactly at the center of mass, the pitching moment about the center of mass from it is exactly zero. The lethal nose-down pitching moment has then been eliminated. The lift component can be further increased, so that the total force vector now points in front of and above the center of mass to provide a nose-up pitching moment. This may be necessary due to the main wheels generating a nose-down moment. Too much nose-up moment may result in an undesirable porpoising motion of the aircraft. The optimal amount of nose-up pitching moment, if any, may depend on the details of the aircraft and its floats, and may need to be determined empirically in taxi and flight tests. A reasonable starting point for those tests is a zero or slightly nose-up moment.

For both bluff bodies and surface-piercing struts, the skin friction is negligible. In the absence of appreciable tangential stresses and leading-edge suction, the net force on a plate must be perpendicular to the plate. Consider a narrow, sloping plate or strut in front of each nose wheel and its exposed support structure such that the strut is perpendicular to a line that goes through or above the center of mass of the aircraft. If the strut completely shields the wheel and its structure from the hydrodynamic flow, then the fatal nose-down pitching moment is eliminated.

Because the spray pattern downstream of a surface-piercing strut widens with downstream distance, the drag on a downstream body even somewhat larger than the strut can be relatively small (Tulin 1957 and Wagner 1933). The downstream body is shielded by the upstream one. The upstream shielding or deflector strut may be narrower that the nose wheel and its structure, while still shielding them from the water flow and reducing their combined drag. The afterbody may be the spring or other support structure of the gear. It may also be the tire and wheel.

The spanwise width of the strut may locally vary, accommodating the varying local width of the wheel and its support structure. The narrowest possible strut is desirable to reduce both its weight and its aerodynamic drag when the wheels are up.

As the normalized depth increases, the physics changes. The spray at the free surface no longer dominates the dynamics. At sufficiently large depth, the wake flow is in a uniform environment (Wu 1972).

The strut may extend as close as practical to the bottom of the tire on the wheel. Of course, there must be some clearance between the deflector strut and the ground when on land. The strut may be composed of a replaceable or flexible segment at its lower end, so that damage to it from rocks during ground operations is readily and inexpensively repairable.

An important consideration is yawing moments. If the yaw angle with respect to the water flow is not zero for whatever reason, there can be a side force at the nose wheels, resulting in a yawing moment, a rolling moment, or both. If large enough, these moments can cause the aircraft to cartwheel or turn broadside to its direction of motion, resulting in severe deceleration.

In order to inhibit this, the deflector strut may be modified into a non-flat shape in cross section, concave on its upstream face. When the aircraft is yawed, the concave face will preferentially deflect the spray to tend to reduce the yawing angle. For sufficient strength at minimum weight, the deflector strut may be an angle section or modified angle section of aluminum or steel.

In another embodiment, the deflector strut may be an angle section with the apex on the upstream side, so that its forebody drag is minimized while still providing shielding of an afterbody. In the limit of perfect shielding of the afterbody, the afterbody drag would vanish. Consequently, the combined drag for both the forebody and the afterbody would be just the forebody drag. If the forebody is narrower than the afterbody and if the drag goes as the square of the width, then the combined drag would be less than that of an isolated afterbody. If the splash trajectory is straight and tangent to the half angle of the shielding strut, then there is a simple trigonometric relationship between that half angle theta, the width of the afterbody D, and the separation S between the fore- and the afterbody, tan (theta)=D/2S. Here S is defined as the distance from the upstream apex or virtual apex of the forebody to the downstream station of maximum width of the afterbody.

While the force on a surface-piercing strut is initially dominated by the momentum exchange due to splashing and is thus independent of depth, with increasing penetration depth, eventually the force will also depend on the depth. This transition is expected to occur when the depth becomes comparable to or greater than the width of the strut, depending on the geometry of the upstream side of the strut.

The deflector strut need not be exactly flat in the side view. Provided its lift force component is sufficient to raise the net force vector to point sufficiently close to or above the center of mass, the aircraft will not flip over.

Retrofits to existing amphibious aircraft may simply add the deflector strut to an existing aircraft or modify the spring bar so that it has the appropriate slope. For new, clean-sheet designs, the deflector strut can be incorporated into the support structure of the nose wheel, such as the spring bar.

Note that the addition of the deflector strut can decrease the drag component over that of the gear assembly alone. The drag of a surface-piercing strut goes as the square of the spanwise width for shallow depths. If a shielding strut in front of the nose gear is narrower than the gear assembly, the total drag may be less that without the shielding strut. An optimal deflector strut would have the minimum size necessary to generate the required lift and drag components.

The main gear also generates a nose-down pitching moment. Since they are slightly aft of the aircraft CG, it is not feasible to generate a nose-up pitching moment with positive lift from deflector struts in their vicinity. In principle, a negative-lift deflector strut near the main gear might assist in generating a nose-up pitching moment. However, the CG is only slightly forward of the main gear, so the available moment arm for the lift component is small. Properly sized to shield the main gear from the hydrodynamic flow, a small deflector strut would reduce the drag component of the main gear and the associated nose-down pitching moment. It may also rotate the total force vector to reduce the moment arm about the center of mass and hence the nose-down pitching moment. Finally, the drag component of a shield strut leaning forward may be less than that of a vertical strut.

Note also that the hydrodynamic forces of this invention are equally effective at reducing the tendency to flip during downwind landings. The beneficial change in pitching moment is generated purely by the dynamic pressure of the hydrodynamic flow past the shielding struts and the landing gear. At fixed airspeed, the dynamic pressure of the water flow becomes relatively stronger during a downwind water landing. The invention does not rely on the effectiveness of the aircraft's aerodynamic surfaces, which become relatively weaker in a downwind water landing.

While the original invention was motivated by the tragic deaths in amphibious float planes with retractable land wheels, the benefits of the invention are available to amphibious aircraft with fuselage hulls rather than pontoon floats. This is also true for amphibious aircraft with non-retractable land wheels. In that case the deflector struts may be non-retractable as well.

DESCRIPTION OF THE DRAWINGS

In FIG. 1, a conventional amphibious aircraft 1 with floats 2 lands on the water surface 3 with the nose wheels 4 and main wheels 5 mistakenly in the down position. Force vector 6 is generated on the nose wheel support structure 7, and force vector 8 is generated on the main wheels, resulting in a large nose-down pitching moment 9 about the aircraft center of mass 10.

In FIG. 2, deflector struts 11 have been incorporated into the support structure forward of nose wheels 4 and support structure 7 to generate force vector 12, along a line 13 that is oriented forward of the aircraft center of mass 10, resulting in a nose-up pitching moment 14. Deflector struts 15 have been incorporated forward of the main wheels 5 to generate force vector 16, along a line 17.

In FIG. 3, deflector strut 11 is mounted forward of nose wheel 4 and its support structure 7.

In FIG. 4, illustrates a concave geometry of the upstream surface 19 of a deflector strut 20, positioned upstream of nose wheel 4 in a horizontal cross section below the wheel axle.

In FIG. 5, a horizontal cross section below the wheel axle illustrates a wedge geometry of the upstream side 21 of a deflector strut 22, with half angle 23, positioned upstream a distance 24 forward of nosewheel 4 of width 25.

REFERENCES

Chapman, R. B. 1971 Spray Drag of Surface-Piercing Struts, TP251, Naval Undersea Research and Development Center, September.

Hoerner, S. F. 1965 Fluid-Dynamic Drag, self-published.

Kiceniuk, T. 1954 A Preliminary Experimental Study of Vertical Hydrofoils of Low Aspect Ratio Piercing a Water Surface, Report No. E-55.2, Hydrodynamics Laboratory California Institute of Technology, Pasadena, CA.

Tulin, M. P. 1957 David W. Taylor Model Basin, Washington DC, USA, Department of the Navy, Published in: Schiffstechnik, Band 4, Heft 21.

von Karman, T. 1929 The Impact on Seaplane Floats during Landing, National Advisory Committee for Aeronautics, 321 309-313.

Wagner, H. 1933 Über das Gleiten von Wasserfahrzeugen, Jahrbuch der Schiffbautechnik," 34. Also published in English as NACA TM 1139. Washington, April 1948.

Wu, T. Y-T. 1972 Cavity and wake flows, Annual Reviews of Fluid Mechanics, 4, 243-284.

What is claimed is:

1. A deflector strut system on an amphibious aircraft to reduce or to eliminate nose-down pitching moment during wheels-down water landings, the deflector strut system comprising:
   a deployable nose gear having a nose wheel, the nose gear being deployable into a down position; and
   a deflector strut positioned forward of the nose wheel when the nose gear is in the down position, wherein the deflector strut is configured to be narrower in the spanwise direction that the nose wheel.

2. The system of claim 1 wherein the deflector strut is configured as a wedge shape.

3. The system of claim 1 wherein the deflector strut has a non-constant spanwise width.

4. The system of claim 1 wherein the deflector strut has a concave upstream surface.

5. The system of claim 1 wherein the perpendicular bisector to the deflector strut from its centroid is a line that extends substantially through the center of mass of the aircraft.

6. The system of claim 1 wherein the perpendicular bisector of the deflector strut from its centroid is a line that extends in front of the center of mass of the aircraft.

7. The system of claim 1 wherein the deflector strut is curved.

8. The system of claim 1 wherein the lower extremity of the deflector strut consists of a replaceable segment.

9. The system of claim 1 wherein the top of the deployed deflector strut is forward of the bottom of the deployed deflector strut.

10. The system of claim 1 wherein the deflector strut is deployed in the down position by means of mechanical connection to the nose gear.

11. A deflector strut system on an amphibious aircraft to reduce or to eliminate nose-down pitching moment during wheels-down water landings, the deflector strut system comprising:
   a deployable main gear having a main wheel, the main gear being deployable into a down position; and
   a deflector strut positioned forward of the main wheel when the main gear is in the down position, wherein the deflector strut is configured to be narrower in the spanwise direction that the main wheel.

12. The system of claim 11 wherein the deflector strut is configured as a wedge shape.

13. The system of claim 11 wherein the top of the deflector strut is forward of the bottom of the strut.

14. The system of claim 11 wherein the deflector strut is mechanically connected to the main gear.

* * * * *